United States Patent

Jones et al.

[11] Patent Number: 5,867,203
[45] Date of Patent: Feb. 2, 1999

[54] EMI REDUCTION IN OUTPUT DEVICES

[75] Inventors: Christopher Dane Jones, Georgetown; Gary Scott Overall, Lexington; Thomas Campbell Wade, Lexington; Phillip Byron Wright, Lexington, all of Ky.

[73] Assignee: Lexmark International Inc., Lexington, Ky.

[21] Appl. No.: 857,228

[22] Filed: May 16, 1997

[51] Int. Cl.$^6$ ................................................. G11B 20/18
[52] U.S. Cl. .......................... 347/251; 347/240; 358/463
[58] Field of Search .................................... 347/131, 142, 347/144, 251, 252, 240; 358/290, 382, 504, 456, 463, 471; 395/117, 167, 168, 169

[56] References Cited

U.S. PATENT DOCUMENTS

| | | | |
|---|---|---|---|
| 4,042,939 | 8/1977 | Lloyd et al. | 347/152 |
| 4,111,543 | 9/1978 | Steiner | 399/77 |
| 4,111,544 | 9/1978 | Steiner | 399/77 |
| 4,504,139 | 3/1985 | Nozaki et al. | 399/88 |
| 4,517,579 | 5/1985 | Kitamura | 347/133 |
| 4,701,836 | 10/1987 | Horlander | 347/195 |
| 4,799,069 | 1/1989 | Sasaki et al. | 347/252 |
| 4,972,210 | 11/1990 | Woo | 347/237 |
| 5,051,815 | 9/1991 | Hidaka | 257/659 |
| 5,184,153 | 2/1993 | Daniels et al. | 347/262 |
| 5,204,693 | 4/1993 | Yagoto | 347/246 |
| 5,225,850 | 7/1993 | Egawa et al. | 347/246 |
| 5,233,337 | 8/1993 | Takahashi | 345/82 |
| 5,241,662 | 8/1993 | Maniwa et al. | 711/218 |
| 5,264,868 | 11/1993 | Hadley et al. | 347/237 |
| 5,289,112 | 2/1994 | Brown et al. | 323/315 |
| 5,298,941 | 3/1994 | Tenpaku | 399/75 |
| 5,333,038 | 7/1994 | Mizoguchi et al. | 399/46 |
| 5,379,126 | 1/1995 | Seto et al. | 358/456 |
| 5,481,656 | 1/1996 | Wakabayashi et al. | 395/115 |
| 5,483,625 | 1/1996 | Robertson et al. | 395/117 |
| 5,521,625 | 5/1996 | Morrison | 347/108 |

FOREIGN PATENT DOCUMENTS 2 295 258 A   5/1996   United Kingdom ........... G06K 15/12

*Primary Examiner*—N. Le
*Assistant Examiner*—Hai C. Pham
*Attorney, Agent, or Firm*—John J. Mcardle, Jr.

[57] ABSTRACT

A method of reducing EMI when printing an image with a printer having a laser includes determining edge pels located near an edge of the image, determining interior pels located within the image and not edge pels, forming edge pels by operating the laser at a first duty cycle and forming at least a portion of a plurality of interior pels by operating the laser at a second duty cycle longer than the first duty cycle. Another aspect is a method of reducing EMI in a printer when forming a latent image on a photoconductive member by gating a light source ON and OFF, including the steps of identifying a first region near an edge of an image to be formed, the first region being formed by gating the light source at a first frequency; and identifying an interior region of the image to be formed, the interior region being formed by gating the light source at a second frequency lower than the first frequency.

23 Claims, 9 Drawing Sheets

EMI REDUCTION IN OUTPUT DEVICES

FIELD OF THE INVENTION

This invention relates to the field of output devices. More particularly the invention relates to reducing electromagnetic interference generated by electrophotographic printers.

BACKGROUND OF THE INVENTION

It is useful to think of printed images as being constructed of printer elements, or pels. A pel is sometimes referred to as a dot, and the resolution of a printer is often characterized by the number of dots that it can print within a given linear distance, such as 1,200 dots per inch.

Laser-based electrophotographic printers typically form images by scanning a laser across the surface of a drum. The laser is pulsed on and off as it scans across the surface of the drum. Those portions of the drum surface that are struck by the beam of the laser undergo a physical change that enables the drum to pick up and then place toner on a sheet of paper.

To form a dot, the laser may be pulsed on and then off again for a given length of time within the pel. Often, a fifty percent duty cycle is used, meaning that the laser is off for approximately half of the total scan width of the pel, and on for approximately half of the total scan width of the pel. For example, the laser may be off as it scans across the first quarter of the pel, then pulsed on as it scans the middle half of the pel, and then pulsed off again as it scans across the final quarter of the pel. If a duty cycle greater than about fifty percent is used, the area of the drum surface affected tends to be greater in size than desired, producing a dot of a size that is larger than typically necessary.

Among the general design goals of printers are those of increased speed and increased resolution. Increasing printer speed means to decrease the amount of time required to print a page, or in other words, increase the scan speed of the laser. Increasing the resolution of the printer means to decrease the size of the pels, or in other words, put more pels within a given linear distance. Achieving either of these goals results in the laser operating at an increased frequency. For example, if the scan speed of the laser is increased, then it forms more pels per unit time. Since the laser typically is pulsed on and off again for each pel as described above, the laser is pulsing on and off more frequently per unit time. Similarly, if the resolution increases, then more pels are formed per unit scan distance of the laser. Assuming that the laser scan speed is not reduced, this also means that the laser is pulsed on and off more frequently per unit time. Increasing both speed and resolution at the same time only compounds the situation.

The frequency at which the laser operates tends to be related to the electromagnetic interference (EMI) that is produced by the printer. Typically, increasing the operating frequency of the laser tends to increase the EMI produced by the printer, and any reduction in the operating frequency tends to decrease the EMI. Other factors which tend to affect EMI are the amount of common mode current present on the cable which connects the laser to the laser controller, and the length of that cable.

Governments regulate the amount of radiated EMI that a device such as a printer may emit. Thus, the amount of EMI produced by a printer is of great concern to printer manufacturers. Some manufacturers have reduced the length of the cable carrying the laser control signal to reduce EMI, or reduced the voltage of the laser control signal to the laser, which tends to reduce the current. Other techniques include using coaxial cable or adding toroids to the cable. These methods tend to reduce the antennae effects of the cable, but they tend to be expensive and are typically used as a last resort to save the product schedule. What is needed, therefore, is a method of reducing EMI produced by a printer, without significantly increasing the production cost or reducing the speed or apparent resolution of the printer.

SUMMARY OF THE INVENTION

The above and other needs are met by a method of reducing EMI when printing an image with an electrophotographic printer. The edge pels are determined, which are located both within the image and at the edge of the image. The interior pels, located both within the image and not previously categorized as edge pels, are also located. Edge pels are formed by operating a laser at a first duty cycle, and at least a portion of a plurality of interior pels are formed by operating the laser at a second duty cycle longer than the first duty cycle. The interior pels may be grouped into a first set of interior pels and a second set of interior pels which are interspersed one amongst the other according to a pattern. The pattern is selected to produce a reduced amount of EMI in comparison to a pattern in which the laser is pulsed ON and then OFF again for each pel printed.

In preferred embodiments, adjacent pels are also determined, which are located both within the image and within a predetermined number of pels of the edge pels. The interior pels are then those pels that are located both within the image and not previously categorized as either edge pels or adjacent pels. The predetermined number of pels, by which the adjacent pels are determined, is one, the first set of interior pels is substantially equal in number to the second set of interior pels, the pattern is a checkerboard pattern of the first set and second set of interior pels, the increased laser duty cycle is substantially equal to 100%, and the decreased laser duty cycle is substantially equal to 0%.

By operating the printer according to a preferred method, the edge pels, where the effects of high or low printer resolution are noticeable, are printed at the rated resolution of the printer. As the adjacent pels will often also affect the apparent resolution of the image, they too may be printed at the rated resolution of the printer. However, the interior pels, which comprise a solid printed field, tend to have very little visual effect upon the perceived resolution of the printer, and thus, a lower resolution may be used to print the interior pels. Therefore, for example, every other pel in a row of pels can be printed with a duty cycle of 0%, which is the functional equivalent of skipping the pel, and every other pel can be printed with a duty cycle of 100%, where the skipped and printed pels are alternated row by row in a checkerboard pattern. The checkerboard pattern is selected to produce a reduced amount of EMI in comparison to a pattern that is completely formed using an intermediate duty cycle. This effectually drops the resolution of the interior pels in half, and has a commensurate effect on the frequency of the laser, and thus reduces the EMI produced by the printer.

An electrophotographic printer according to the present invention has means for reducing EMI when printing an image, including pel determination means and print adjustment means. The pel determination means determine the edge pels, adjacent pels, and interior pels, as defined above. The print adjustment means form the edge pels and the adjacent pels using the rated resolution of the printer, and form the interior pels at a predetermined resolution below that of the rated resolution of the printer. In a preferred embodiment, the rated resolution of the printer is 1,200 dpi, and the predetermined resolution is 50% of the rated resolution.

Another aspect of a preferred embodiment of the invention relates to a method of reducing EMI in a printer when forming a latent image on a photoconductive member by gating a light source ON and OFF. The method includes the steps of identifying a first region near an edge of an image to be formed, wherein the first region is formed by gating the light source at a first frequency; and identifying an interior region of said image to be formed, wherein the interior region is formed by gating said light source at a second frequency lower than the first frequency.

In some embodiments, the second frequency is about one-half the frequency of the first frequency. Thus, for example, if the first frequency is about 40 MHz, then the second frequency is selected to be about 20 MHz. Also, in some embodiments, at least one of the first frequency and the second frequency has a duty cycle selectable within a range of about zero percent through 100 percent.

Other features and advantages of the invention may be realized from the drawings and detailed description of the invention that follows.

BRIEF DESCRIPTION OF THE DRAWINGS

Further advantages of the invention will become apparent by reference to the detailed description of preferred embodiments when considered in conjunction with the following drawings, which are not to scale so as to better show the detail, in which like reference numerals denote like elements throughout the several views, and wherein.

DETAILED DESCRIPTION OF THE INVENTION

Figure 1:
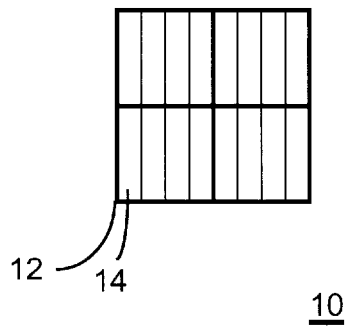
FIG. 1 depicts a block of four pels.

Referring now to the figures, there is depicted in FIG. 1 a representation of a block of four pels 12. The pels 12 form an image 10, which is to be transferred to a medium, typically a sheet of paper. The image 10 may be a character, such as a letter, which is either resident as a font in the printer, or downloaded as a soft font to the printer. Additionally, the image 10 may be a halftone dot of a graphic image, such as a bitmap or a raster image. The image 10 is formed by scanning a laser across the surface of a charged drum, of the type commonly used in laser printers, while pulsing the laser on and off. Those portions of the surface of the drum exposed to the laser are discharged. The drum is rotated past a source of a toner, which is attracted to the discharged portions of the drum, and an amount of toner electrostatically adheres to the drum on these discharged portions. The toner is then brought in contact with a sheet of paper, to which it is electrostatically transferred and then fused.

Pels 12 may conveniently be thought of as being divided into sub portions, which for the sake of this discussion will be called bands 14. In the example depicted in FIG. 1, each pel 12 is divided into four bands 14. However, this number is for example and ease of explanation only, as a pel 12 could be divided into a lesser or greater number of bands 14. The height of each pel 12, and the width of each band 14 is also representative, as the actual width of a band 14 will be dependent upon how quickly a laser can be pulsed on and off, as described more fully below. Similarly, the actual height of the pel 12 will be dependent on the height of the beam produced by the laser. Finally, while the pels 12 are depicted as being square in this example, they could be represented as having another shape, such as circular or rectangular.

Figure 2:
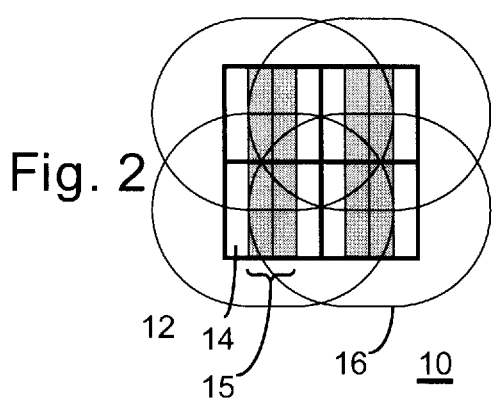
FIG. 2 depicts the exposed areas produced with a 50% duty cycle.

In FIG. 2, patterns have been overlaid on the image 10, representing the area of the drum exposed to a circular-shaped laser image. In FIG. 2, the exposed areas 16 are just slightly larger than the pels 12. An exposed area 16 of this size could be produced by pulsing the laser on for less than all of the bands 14 of pel 12. For example, in the image 10 depicted in FIG. 2, the exposed areas 16 could have been produced by turning the laser on only while it scanned across the two center bands 15 of each pel 12. As the laser spot size is greater than the size of the bands 14, printing the center bands 15 of each pel 12 will tend to create an exposed area 16 having a size greater than the size of the printed bands.

In the example depicted, the exposed areas 16 are convolutions of a circular laser spot as it moves across the width of the combined printed bands 15. However, this is for representative purposes only, and the actual shape of the exposed area 16 may depend on many variables, such as the structure of the drum surface, the shape of the laser beam, the length of time for which the laser is pulsed on, and the scan speed of the laser.

Because the laser is on for only half, or 50%, of the bands 14 within each pel 12, it is said that the laser is operating at a 50% duty cycle. If the laser was on for only one of the bands 14 within each pel 12, then a 25% duty cycle would be used. If there were a different number of bands 14 within each pel 12, such as twenty bands 14, and the laser was on for only one band 14, then the duty cycle would be 5%. Printing the pels 14 with a larger duty cycle tends to increase the size of the exposed area 16 eventually produced, and decreasing the duty cycle of the laser tends to decrease the size of the exposed area 16 produced by each pel 12. Of course, printing with a duty cycle of 0% means that the pel 12 is not printed at all.

Figure 3:
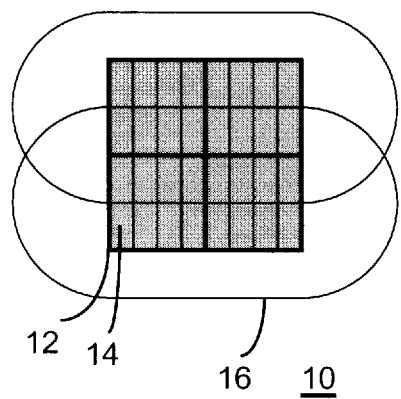
FIG. 3 depicts the exposed areas produced with a 100% duty cycle.

FIG. 3 depicts an image 10 that is produced by printing each band 14 within each pel 12, or in other words, with a duty cycle of 100%. As can be seen by comparing the exposed areas 16 of FIG. 2 with the exposed areas 16 of FIG. 3, the exposed areas 16 produced with a 100% duty cycle are larger than those exposed areas 16 produced with a 50% duty cycle. It will be appreciated that the relative sizes of the exposed areas 16 depicted in FIGS. 2 and 3 are not to scale, but illustrate the concept of the relationship between duty cycle and exposed area 16 size.

It is typically counterproductive to print pels with a duty cycle of 100%. Ideally, in order to reproduce all of the original detail in the bitmap, printed areas should be equal in size and shape to the area represented by the pels in the original bitmap. For example, if it was desired to print an image 10 of a solid square box, the image 10 would be more distorted when printed using larger exposed areas 16. Printing image 10 with smaller exposed areas 16 produces a better approximation of the original pels in the bitmap. Thus, a reduced duty cycle tends to produce images in which a greater degree of control is available, and thus a greater resolution is possible. Because the laser is pulsed on and off for each pel 12 that uses less than a 100% duty cycle (except for pels 12 that are not printed, or in other words have a 0% duty cycle, during which the laser is never pulsed on), printing with a duty cycle below 100% tends to produce EMI. As the size of the pels 12 decrease, and the scan speed of the laser increases, the frequency at which the laser is pulsed on and off also increases, thus increasing the EMI produced, as described above. Thus, printing at higher resolutions has traditionally increased the EMI produced by a printer.

Figure 4:
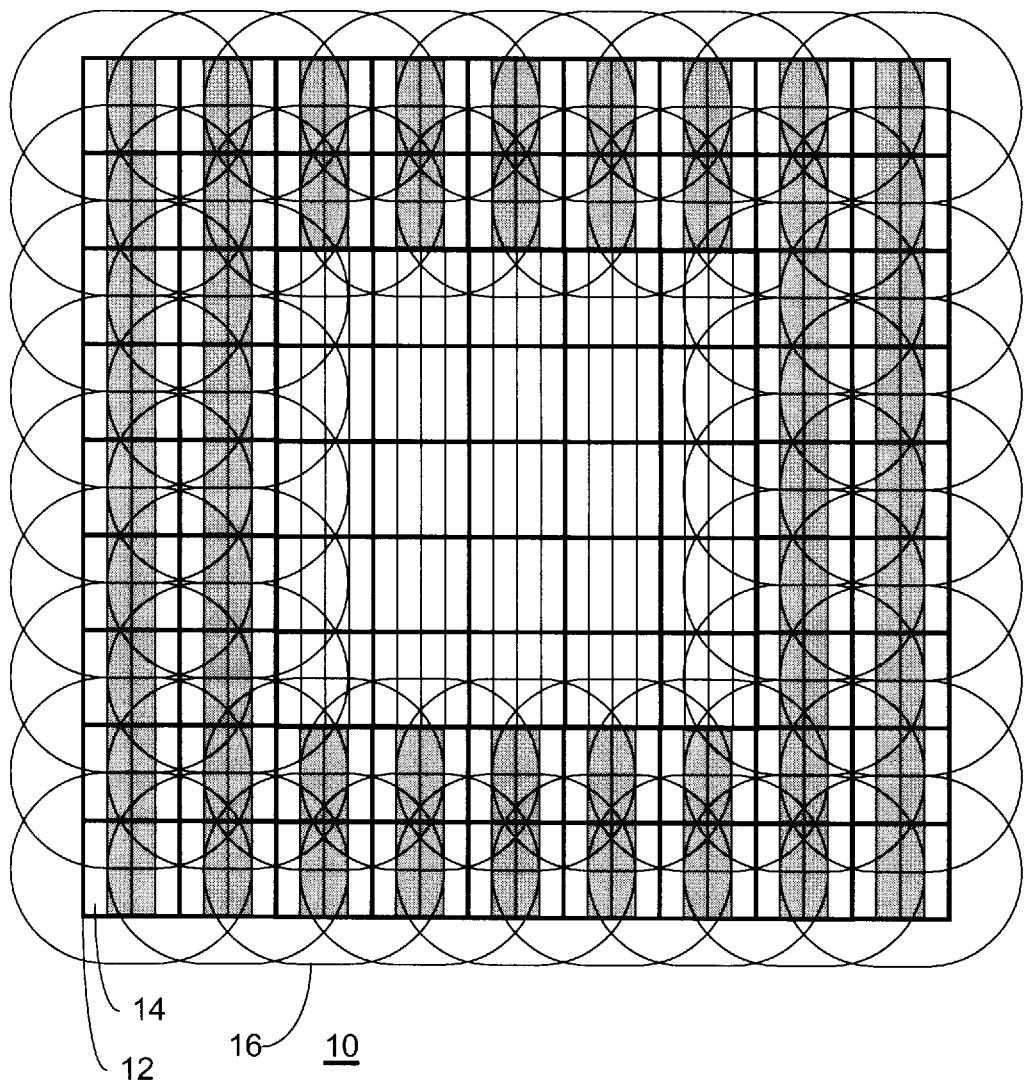
FIG. 4 depicts the edge pels and adjacent pels printed with a 50% duty cycle.

A method according to the present invention overcomes this problem by printing some of the pels 12 with one duty cycle and printing others of the pels 12 at another duty cycle or a combination of different duty cycles. FIG. 4 depicts a larger image 10 in which there are pels 12 having bands 14. While the image 10 in FIG. 4 is depicted as being square, as are the images 10 in FIGS. 1–3, it will be appreciated that this simplification has been made so that the discussion and figures can concentrate on the more important aspects of the invention, rather than on the intricacy of the shape of the image 10. However, the invention is equally applicable to any and all shapes of images 10.

Those pels 12 that are located within the image 10, meaning that they are not in a non-printed area outside of the image 10 (which pels 12 are not depicted for clarity's sake), and are also located at the edge of the image 10, are determined and designated as edge pels. Those pels 12 that are located within the image 10 and are located within a predetermined number of pels 12 of the edge pels are also determined, and designated as adjacent pels. The edge pels and the adjacent pels are printed with a standard duty cycle, nominally 50%. This is the equivalent of printing the edge pels and the adjacent pels at the rated resolution of the printer, as the duty cycle and final resolution tend to be related as described above.

In the example of FIG. 4, the predetermined number, by which the adjacent pels are determined, is one. Thus, the outermost circumference of pels 12 are the edge pels, and are printed at the standard duty cycle, and the immediately adjacent circumference of pels 12 are the adjacent pels, and they are also printed at the standard duty cycle. If the predetermined number was two, then an additional circumference of pels 12 would be designated as adjacent pels, and they too would be printed at the standard duty cycle. The predetermined number can be any number from zero (meaning that no adjacent pels are determined) and up, but in the preferred embodiment, the predetermined number is one, as depicted.

The edge pels are printed at the rated duty cycle of the printer because it is at the edge of an image 10, where the transition between a printed field and a non-printed field occurs, that the effects of high or low resolution are most dramatically seen. This would also be the case if the image 10 had an unprinted field situated within the borders of the image 10. In this case, those pels 12 which were both within the image 10, and at the edge of the unprinted field within the image 10, would also be determined as being edge pels. Similarly, those pels 12 within a predetermined number of pels 12 of those edge pels, would be determined as being adjacent pels.

The adjacent pels are also printed at the standard duty cycle of the printer, because to they tend to also affect the apparent resolution of the printer. This is because printer edge smoothing logic often acts on bands within both the edge pels and the adjacent pels. Thus, even at a duty cycle of 50%, printer logic may decide to print the first two bands 14 of the edge pel, rather than the center two bands 14. So as to not interfere with this logic, the edge pels and the adjacent pels are printed at the standard duty cycle, or rated resolution of the printer.

Figure 5:
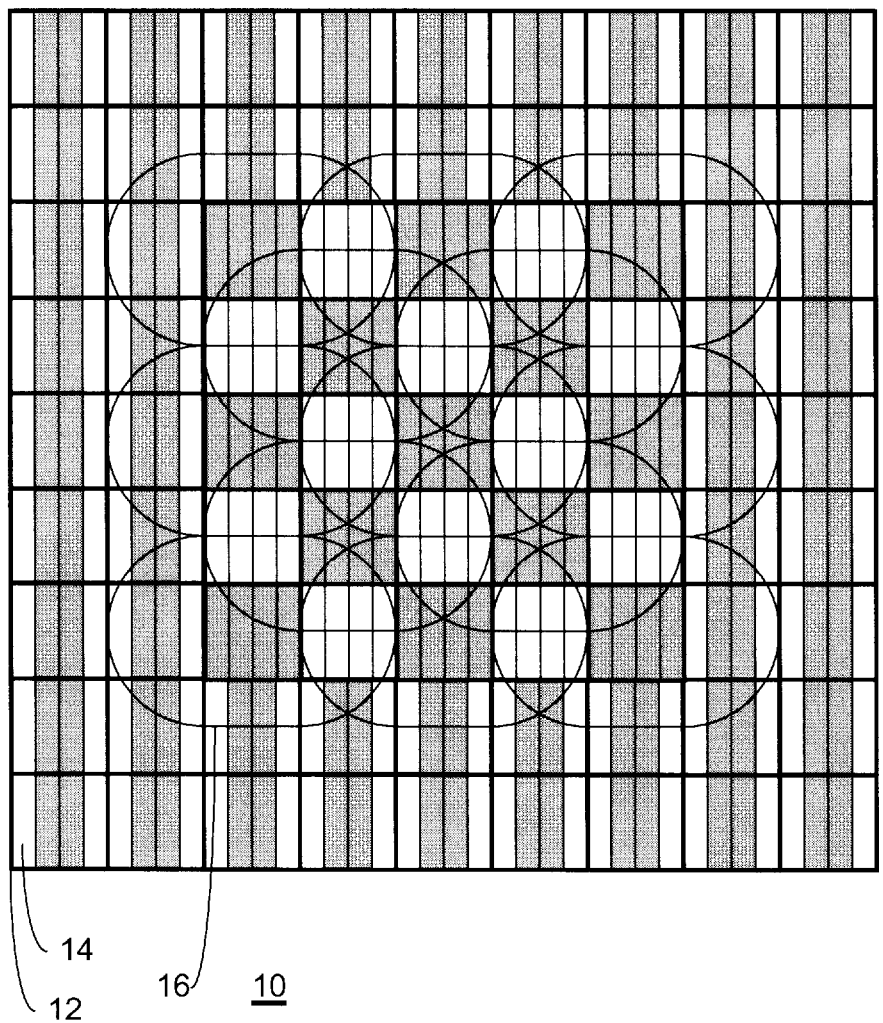
FIG. 5 depicts a first embodiment of a pattern of interior pels printed with a 100% and 0% duty cycle.

However, the interior pels of the image 10 do not have such an effect on the apparent resolution of the printer. Thus, those pels 12 which are located within the image 10, and are not edge pels or adjacent pels, are determined as being interior pels. A first set of interior pels is formed using an increased laser duty cycle, and a second set of interior pels is formed a 20 using a decreased laser duty cycle, as depicted in FIG. 5. FIG. 5 depicts every other one of the interior pels of image 10 being printed with a 100% duty cycle. These pels 12 have an exposed area 16 centered over them, and they comprise the first set of interior pels. The other interior pels have been printed with a duty cycle of 0%, or in other words, have been skipped and not printed at all. These pels 12 comprise the second set of interior pels. The exposed areas 16 produced by printing the edge pels and adjacent pels have not been depicted in FIG. 5, so that they do not unnecessarily distract from the present discussion.

As can be seen in the example depicted, the exposed area 16 size produced by the 100% duty cycle used on the first set of interior pels is sufficient to cover in an unbroken manner all of the area represented by the interior pels, even though the second set of interior pels have not been printed at all in this example. Thus, the interior pels have been printed at what is effectively about half of the rated resolution of the printer. More importantly (to the present discussion), the frequency at which the laser is pulsed off and on has been reduced by about half as well. In other words, instead of pulsing the laser on and off one time for each of the interior pels, the laser has been pulsed on and off only one time for every two of the interior pels. Thus, for example, if the edge pels adjacent the edge of the image are formed by gating the laser on or off at a frequency of about 40 MHz, then the frequency at which the interior pels are formed is reduced to about 20 MHz. As a result, the amount of EMI produced by the printer during the formation of the interior pels has been effectively cut in about half, while the apparent resolution of the printed image 10 has not been altered at all. From this, it follows that effective EMI reduction will be achieved if the frequency at which interior pels are formed is selected to be less than the frequency selected to form the pels near the edge of the image.

The first set of interior pels and the second set of interior pels are interspersed one amongst the other according to a pattern. In the example depicted in FIG. 5, the pattern is that of a checkerboard, where there is one pel 12 printed with a 100% duty cycle between each pel 12 that is skipped, and the location of the skipped pels 12 are alternated between consecutive rows. It will be appreciated that, depending upon the exposed area 16 size, the pattern may have two skipped pels 12 between every printed pel 12. In addition, and again based upon the size of the exposed area 16 produced, the printed interior pels of the first group may be printed at a duty cycle less than 100%, as long as the duty cycle used to print the interior pels 12 of the first group is sufficient to produce exposed areas 16 that cover entirely the desired printed area within the image 10.

For example, every other row of interior pels of the first group could be printed with a 100% duty cycle, but since they might produce exposed areas 16 that come so close to joining, the interdigitated rows of interior pels of the first group may only need to be printed with a duty cycle of 25%.

Figure 6:
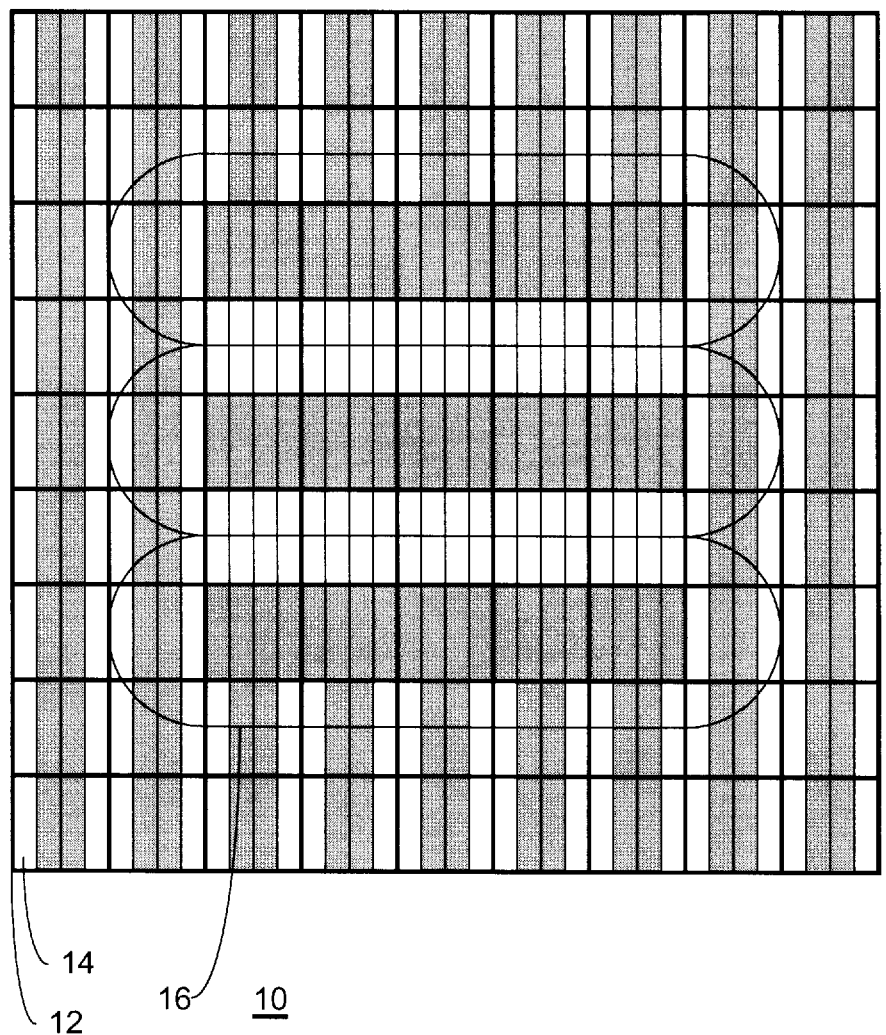
FIG. 6 depicts a second embodiment of a pattern of interior pels printed with a 100% and 0% duty cycle.

Other patterns are also possible, besides checkerboards. For example, FIG. 6 depicts the first set of interior pels being printed in alternating rows, interdigitated with skipped rows of interior pels of the second set. Again, more than one consecutive row of the first set of interior pels could be printed in this manner, and more than one consecutive row of the second set of interior pels could be skipped. When printing solid rows of the interior pels of the first set, it would be preferred to print each pel 12 at a duty cycle of 100%, otherwise the laser would be pulsed on an off again during the scan of that row, and the reduction of EMI would not be as efficient. Another pattern that could be used is a random pattern where sufficient pels are turned on such that the desired toner coverage is achieved.

Figure 7:
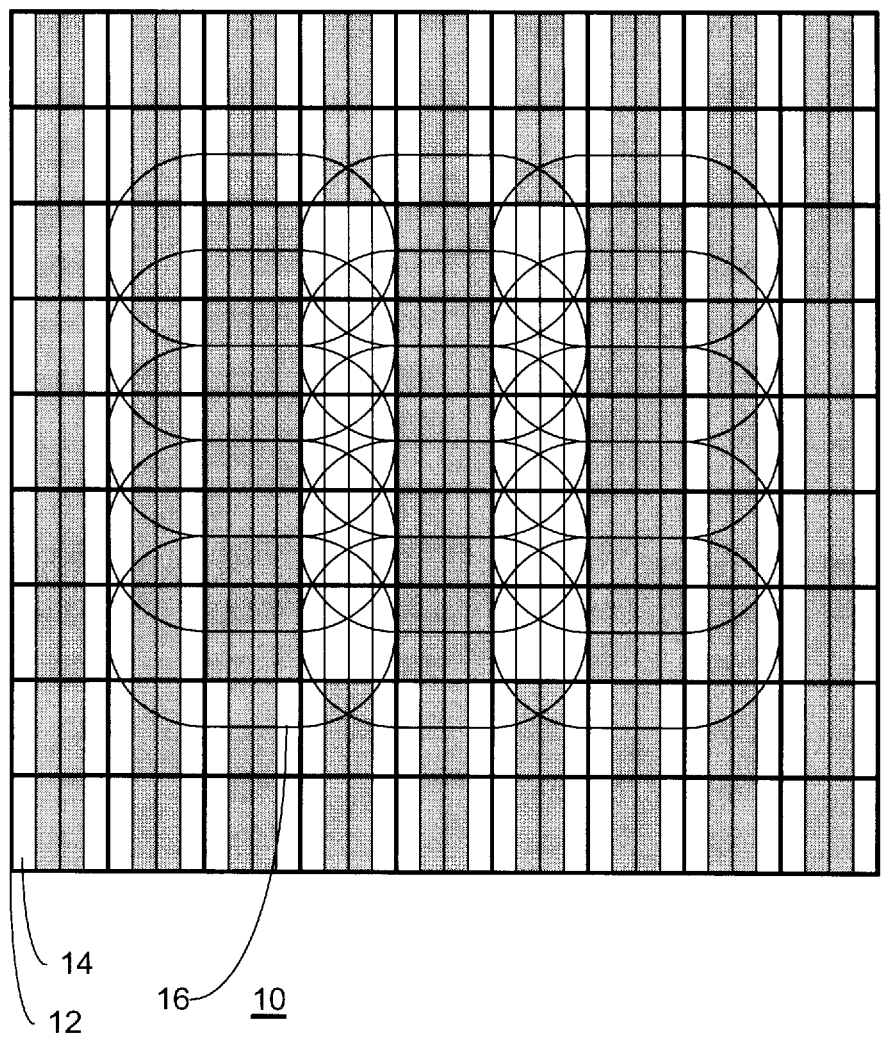
FIG. 7 depicts a third embodiment of a pattern of interior pels printed with a 100% and 0% duty cycle.

Further, FIG. 7 depicts the first set of interior pels being printed in alternating columns, interdigitated with skipped columns of interior pels of the second set. As described above, more than one consecutive column of the first set of interior pels could be printed in this manner, and more than one consecutive row of the second set of interior pels could be skipped. Also, and again as previously mentioned, the alternating columns of printed interior pels of the first set could be printed at a duty cycle less than 100%, or some columns of the interior pels of the first set could be printed with a duty cycle of 100%, and others of the columns of the interior pels of the first set could be printed with a reduced duty cycle, which would be just sufficient to ensure that there were no undesired unprinted regions within the image 10.

In an alternate embodiment, because the laser can be pulsed on and off at any position along a scan of the interior region of the image 10, the definition of the pel 12 tends to lose some preconceived rigidity. For example, if the last two bands 14 of a first pel 12 are printed, and the first two bands 14 of the next pel 12 are printed, the four printed bands 14 can be considered as a single pel 12 printed at a 100% duty cycle. Further, this printed block may start at a location that does not align with the onset of a band 14, or continue for the exact equivalent of an integer number of bands 14. Thus, pel 12 and band 14 shifting may occur during the printing of the image 10, and the printed areas within the image 10, or in other words the interior pels of the first set, may be in a pattern that is asynchronous to the preconceived pel 12 boundaries.

Figure 8:
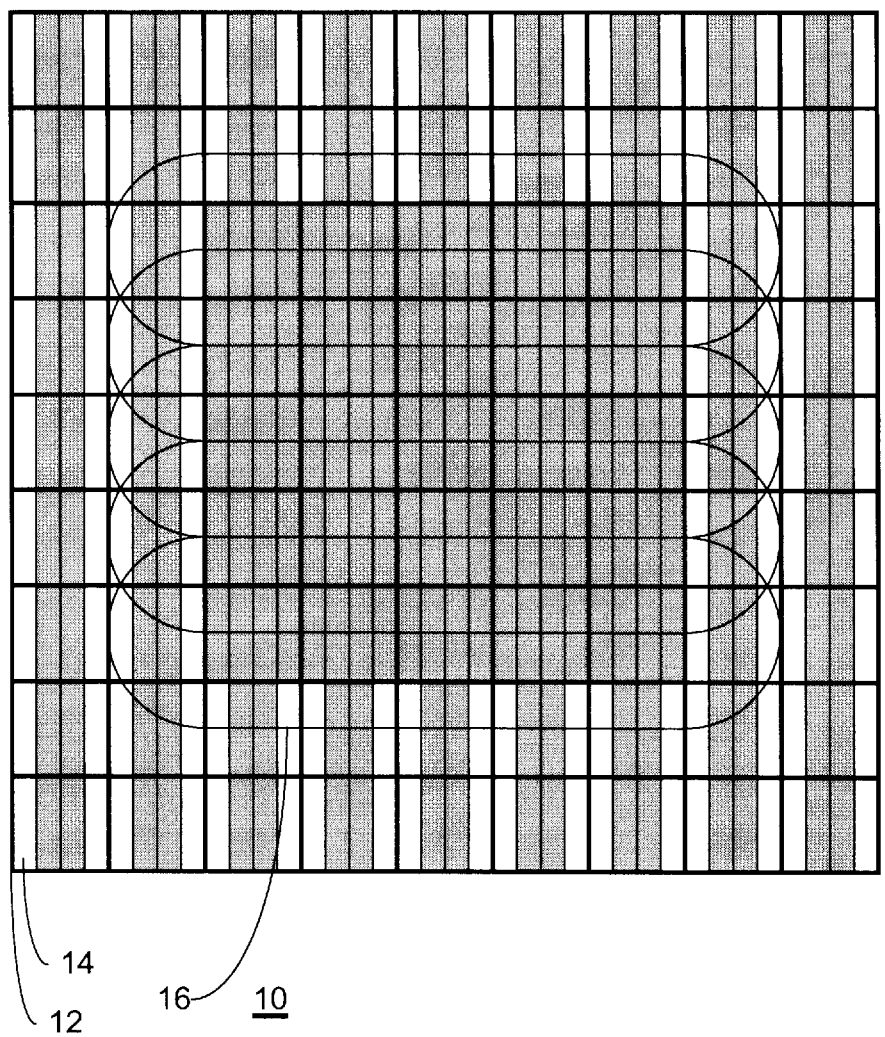
FIG. 8 depicts a fourth embodiment of a pattern of interior pels printed with a 100% duty cycle only.

FIG. 8 depicts the first set of interior pels as being all of the interior pels, and all of the interior pels being printed with a duty cycle of 100%.

As is evident from the above discussion of the various patterns, in many of the patterns the number of pels 12 in the first set of interior pels is substantially equal to the number of pels 12 in the second set of interior pels. However, in various embodiments the number of pels 12 in the first set of interior pels may be either slightly or significantly greater or less than the number of pels 12 in the second set of interior pels. In all of the preferred embodiments, the reduced duty cycle used to produce the interior pels of the second set is 0%. However, the increased duty cycle used to produce the interior pels of the first set may be 100% or some other value, or a combination of values, depending on the pattern chosen, as described above.

Figure 9:
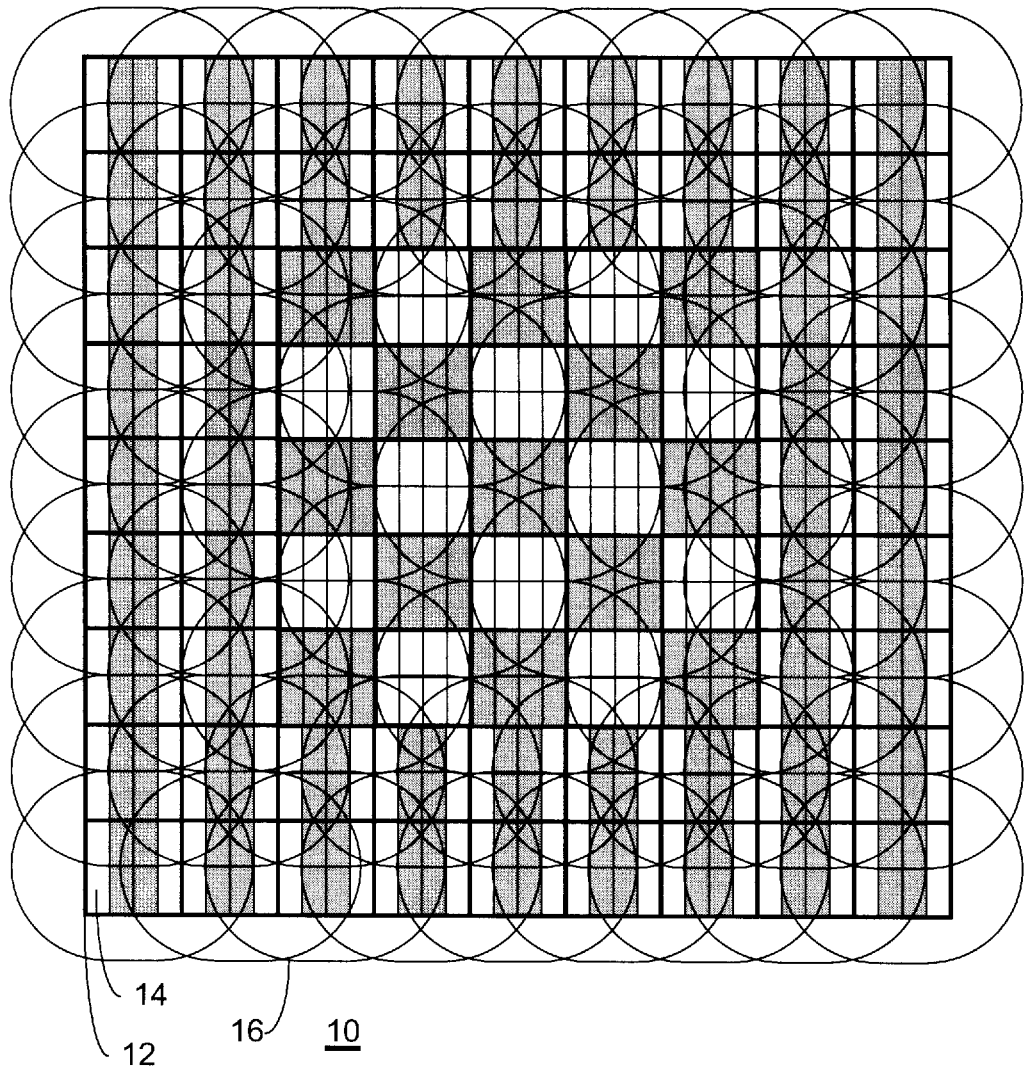
FIG. 9 depicts an image printed according to a method of the present invention.

FIG. 9 depicts how an image 10 may be printed, depicting the edge pels and adjacent pels printed with the standard duty cycle of the printer, and the interior pels being printed in a checkerboard pattern of 100% duty cycle and 0% duty cycle pels 12. As images 10 typically have a much greater number of interior pels than edge pels and adjacent pels, reducing the EMI produced during the printing of the interior pels can be a significant reduction in the overall amount of EMI produced by a printer.

Figure 10:
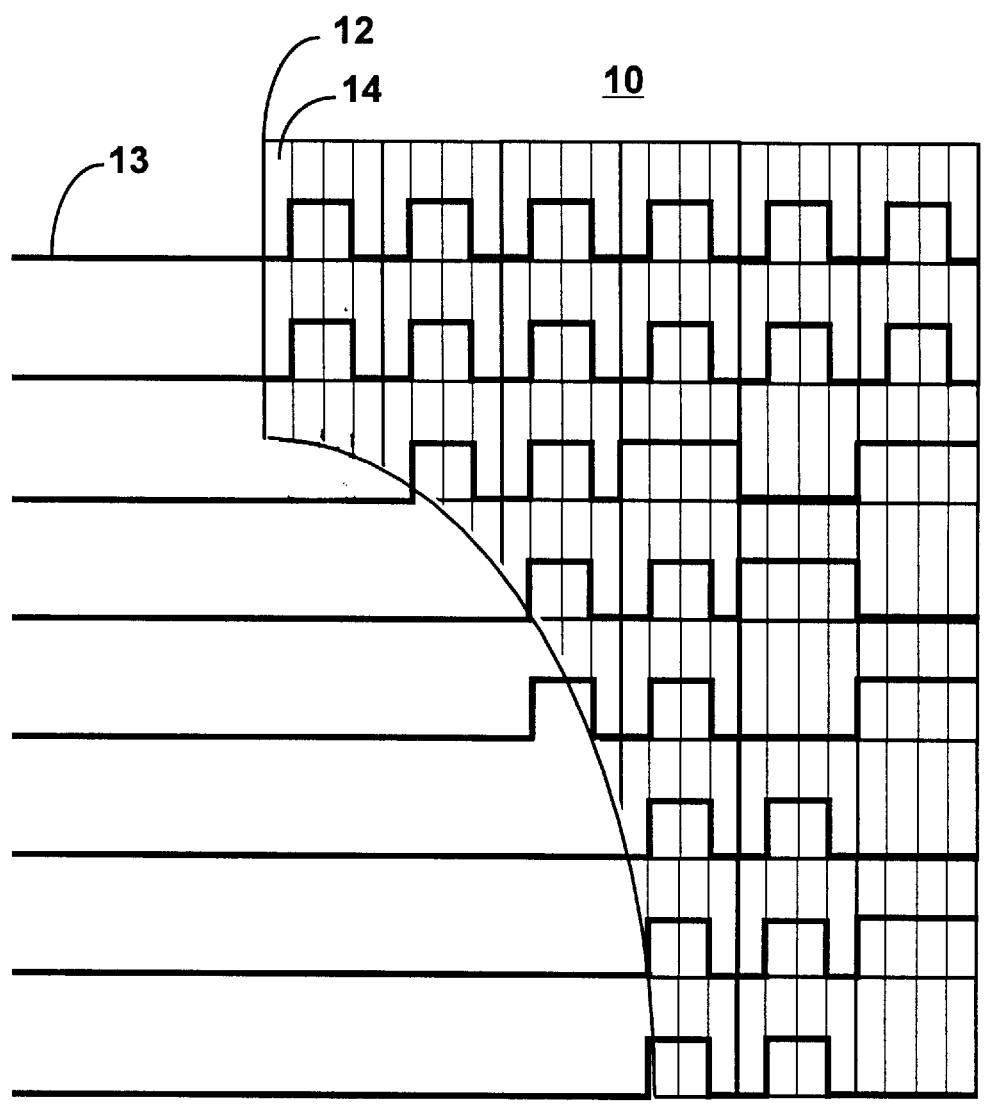
FIG. 10 depicts an alternating duty cycle pattern used to print an image.

FIG. 10 provides a somewhat different representation of the image 10, in which the laser power is depicted for each band 14 within the image 10. The lines 13 represent the laser control signal or state. When the line 13 is at a baseline level at the bottom of a row of pels 12, it represents the laser being off. When the line 13 is at a midpoint of a row of pels 12, it represents the laser being on. It will be appreciated that the image 10 in this depiction represents only the top left corner of an image 10, such as the corner portion of a letter. is Thus, the pels 12 on the top and left edges of the image 10 are edge pels, while the pels 12 on the right and bottom edges of the image 10 are not necessarily edge pels, and may be interior pels or adjacent pels.

All of the pels 12 in the top row of pels 12 are edge pels. Thus, according to the invention, these pels 12 are printed with a standard duty cycle, which in this example is 50%. Therefore, the laser is pulsed on for half of the bands 14 within each of the pels 12 of the top row. This depiction provides a more graphical understanding of how the duty cycle affects EMI, as any duty cycle between, but not including, 0% and 100% will require the laser to be pulsed on and off. The second row of pels 12 are classified as edge pels (the leftmost pel 12 in the row) and adjacent pels (the rest of the pels in the row). In this example, the adjacent pels are also printed with a standard duty cycle, which again is 50%.

In the third row of pels 12, after the edge pel and adjacent pel are printed with the standard duty cycle, the interior pels are printed with a pattern of increased duty cycle pels 12 and decreased duty cycle pels 12. In this example, the increased duty cycle is 100% and the decreased duty cycle is 0%, and the pattern is a checkerboard pattern. Thus, for the third pel 12 in row three, which is the first interior pel encountered in the image 10, the laser is pulsed on during all four bands 14 of the pel 12. Then in the next pel 12, the fourth pel 12 of the third row of pels 12, the laser is kept off for all four bands 14 of the pel 12. This on-again off-again pattern is repeated across the row of pels 12 until the next adjacent pel is encountered (not depicted).

Notice that in the fourth row of pels 12, after the edge pel and adjacent pel are printed with a standard duty cycle, that those interior pels which are printed with a 100% duty cycle are alternated in each column with interior pels of the rows immediately above and below that are printed with a 0% duty cycle. It will be appreciated, however, that patterns other than a checkerboard pattern of one 100% duty cycle pel 12 and one 0% duty cycle pel 12 could have been chosen.

FIG. 10 thus provides a very graphic representation of how the frequency of the laser is affected by alternating the duty cycle of the laser in this manner. As can be seen, on the top row of pels 12, which are all edge pels, the laser is pulsed on and off once pel 12. In the interior of the image 10, however, the laser is pulsed on and off once per every two interior pels. Thus, the EMI produced by printing the interior pels is cut in half with this pattern. Other patterns will cut the EMI produced by a greater or lesser degree, depending on how often they require the laser to be pulsed on and off.

As briefly mentioned above, there are other considerations which are typically taken into account when printing edge pels and adjacent pels. These considerations have to do with smoothing the edges of a printed image 10, such as along the curved portion of the image 10 depicted in FIG. 10. Thus, the edge pels and adjacent pels may not be printed with a standard duty cycle, even when implementing a method of printing according to the present invention. The term "standard duty cycle" as applied to edge pels and adjacent pels refers to how they would normally be printed, without taking into account the methods of the present invention.

These additional considerations have not been discussed at length in this disclosure so as to not unduly confuse them with the present invention. However, it will be understood that the methods of the present invention do not conflict with or exclude the use and benefit of such edge smoothing methods. One of the benefits of the present invention is that the edge pels and a determinable depth of adjacent pels may be left unmodified by a method of the present invention, so that they may be modified by optimized edge smoothing and enhancement routines.

In yet a further embodiment, the pattern of a checkerboard of 100% pels of the first set and 0% pels of the second set that comprise the interior pels can be produced by merely shifting the printed bands 14 within each pel 12. For example, by printing the third and fourth bands 14 within a first pel 12, and then printing the first and second bands 14 within the next pel 12, an alternating pattern of four printed bands 14 and four unprinted bands 14 is produced. This looks exactly like 100% pels 12 alternating with 0% pels 12, but is comprised instead of 50% pels 12 wherein the two printed bands 14 are alternately shifted one band 14 back in one pel 12, and one band 14 forward in the next pel 12. This method also reduces the frequency of the laser, even though each interior pel is printed at the standard duty cycle, and is the functional equivalent of some of the other embodiments presented.

Figure 11:
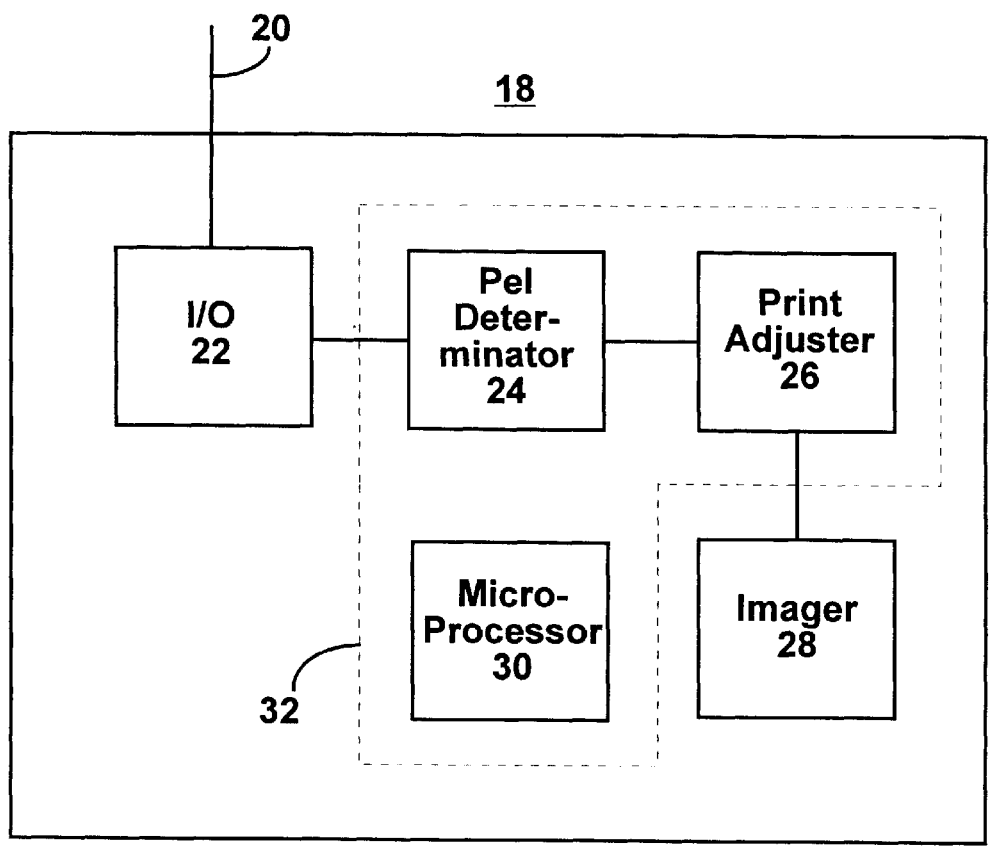
FIG. 11 is a functional schematic diagram of a printer according to the present invention.

FIG. 11 depicts a laser printer 18, such as a 1200 pel, or dot, per inch (dpi) printer, incorporating improvements according to the methods of present invention. Data is received by the printer 18 on line 20 through a data input/output 22. The data is processed by a pel determinator 24, which determines: edge pels located within and at the edge of the image; adjacent pels located within the image and within a predetermined number of pels of the edge pels, and; interior pels located within the image and not edge pels or adjacent pels. The data is processed by a print adjuster 26, which forms the edge pels and the adjacent pels using the rated resolution of the printer, and forms the interior pels at a predetermined resolution below that of the rated resolution of the printer. As described above, this predetermined resolution will be determined by the pattern formed by the first set of interior pels and the second set of interior pels.

The data is then sent to an imager 28, typically comprising a laser, a photoconductive member such as a drnm, and other components well known in the art. The entire printer 18 may be under the control of a microprocessor 30. In various embodiments, the pel determinator 24, the print adjuster 26, and the microprocessor 30 may all be implemented in the same component 32. In other embodiments, the pel determinator 24 and print adjuster 26 may be separate as depicted. In yet other embodiments, the pel determinator 24 and the print adjuster 26 may be embodied in a single ASIC, yet separate from the microprocessor 30.

While specific embodiments of the invention have been described with particularity above, it will be appreciated by those skilled in the art that changes may be made in form and in detail without departing from the spirit and scope of the following claims.

We claim:

1. A method of reducing EMI when printing an image with a printer having a laser, comprising:

determining edge pels located near an edge of the image, determining interior pels located within the image and not edge pels, forming edge pels by operating said laser at a first duty cycle; and forming at least a portion of a plurality of interior pels by operating said laser at a second duty cycle longer than said first duty cycle.

2. The method of claim 1, wherein the step of determining interior pels further comprises:

determining adjacent pels located within the image and within a predetermined number of pels of the edge pels, and determining interior pels located within the image and not edge pels and not adjacent pels.

3. The method of claim 1, wherein the step of determining interior pels further comprises determining a first set of interior pels and a second set of interior pels.

4. The method of claim 3, wherein the step of determining interior pels further comprises determining a first set of interior pels and a second set of interior pels where the first set of interior pels is substantially equal in number to the second set of interior pels.

5. The method of claim 3, wherein the step of determining interior pels furter comprises determining a first set of interior pels and a second set of interior pels where the first set of interior pels is less in number than the second set of interior pels.

6. The method of claim 3, wherein the step of determining interior pels further comprises determining a first set of interior pels and a second set of interior pels where the first set of interior pels is greater in number than the second set of interior pels.

7. The method of claim 3, wherein the step of forming at least a portion of the plurality of interior pels fuirther comprises forming the first set of interior pels in alternating rows with the second set of interior pels.

8. The method of claim 3, wherein the step of forming at least a portion of the plurality of interior pels further comprises forming the first set of interior pels in alternating columns with the second set of interior pels.

9. The method of claim 3, wherein the step of forming at least a portion of the plurality of interior pels fuirther comprises forming the first set of interior pels in a checkerboard pattern with the second set of interior pels.

10. The method of claim 3, wherein the step of forming at least a portion of the plurality of interior pels further comprises forming the first set of interior pels and the second set of interior pels in a random pattern.

11. The method of claim 1, wherein the step of forming at least a portion of the plurality of interior pels further comprises forming the portion of the plurality of interior pels at a second duty cycle substantially equal to 100%, and forming an interior pattern substantially as a solid field.

12. The method of claim 1, wherein the step of forming at least a portion of the plurality of interior pels further comprises forming the portion of the plurality of interior pels by operating the laser at a second duty cycle, where the first duty cycle is about one-half that of the second duty cycle.

13. A method of reducing EMI when printing an image with an electrophotographic printer comprising:
   determining edge pels located within and at the edge of the image,
   determining adjacent pels located within the image and immediately adjacent the edge pels,
   determining interior pels located within the image and not edge pels or adjacent pels,
   forming the edge pels and the adjacent pels using a laser duty cycle of 50%,
   forming a first set of interior pels using a laser duty cycle of 100%,
   forming a second set of interior pels using a laser duty cycle of 0%, and
   where the first set of interior pels and the second set of interior pels are interspersed one amongst the other in a checkerboard pattern that is selected to produce a reduced amount of EMI in comparison to a pattern that is completely formed using an intermediate duty cycle.

14. A method of reducing EMI when printing an image with an electrophotographic printer comprising:
   determining edge pels located within and at the edge of the image,
   determining adjacent pels located within the image and immediately adjacent the edge pels,
   determining interior pels located within the image and not edge pels or adjacent pels,
   forming the edge pels and the adjacent pels at the rated resolution of the electrophotographic printer, and
   forming the interior pels at a resolution below the rated resolution of the electrophotographic printer.

15. In an electrophotographic printer, an improvement for reducing EMI when printing an image, comprising:
   pel determination means for determining edge pels located within and at the edge of the image, determining adjacent pels located within the image and within a predetermined number of pels of the edge pels and determining interior pels located within the image and not edge pels or adjacent pels; and
   print adjustment means for forming the edge pels and the adjacent pels using the rated resolution of the printer, and forming the interior pels at a predetermined resolution below that of the rated resolution of the printer.

16. The printer of claim 15, wherein the predetermined number of pels is one.

17. The printer of claim 15, wherein the rated resolution of the printer is 1,200 dpi.

18. The printer of claim 15, wherein the predetermined resolution is 50% of the rated resolution of the printer.

19. A method for reducing EMI produced by a laser in a printer having a standard duty cycle and a rated resolution comprising:
   selecting a duty cycle that is greater than the standard duty cycle,
   selecting a duty cycle that is less than the standard duty cycle, and
   reducing the frequency at which the laser is operated by alternately printing interior pels at the duty cycle that is greater than the standard duty cycle and the duty cycle that is less than the standard duty cycle.

20. The method of claim 19, wherein the step of alternately printing interior pels further comprises forming a checkerboard pattern of interior pels printed with the duty cycle that is greater than the standard duty cycle and the duty cycle that is less than the standard duty cycle.

21. The method of claim 19 wherein the step of selecting a duty cycle that is less than the standard duty cycle comprises selecting a duty cycle of 0%.

22. A method of reducing EMI in a printer when forming a latent image on a photoconductive member by gating a light source ON and OFF, said method comprising the steps of:
   identifying a first region near an edge of an image to be formed, said first region being formed by gating said light source at a first frequency; and
   identifying an interior region of said image to be formed, said interior region being formed by gating said light source at a second frequency lower than said first frequency.

23. The method of claim 22, wherein the step of gating the light source at a second frequency fuirther comprises gating the light source at a second frequency that is about one-half the frequency of said first frequency.

* * * * *